United States Patent Office 3,054,378
Patented Sept. 18, 1962

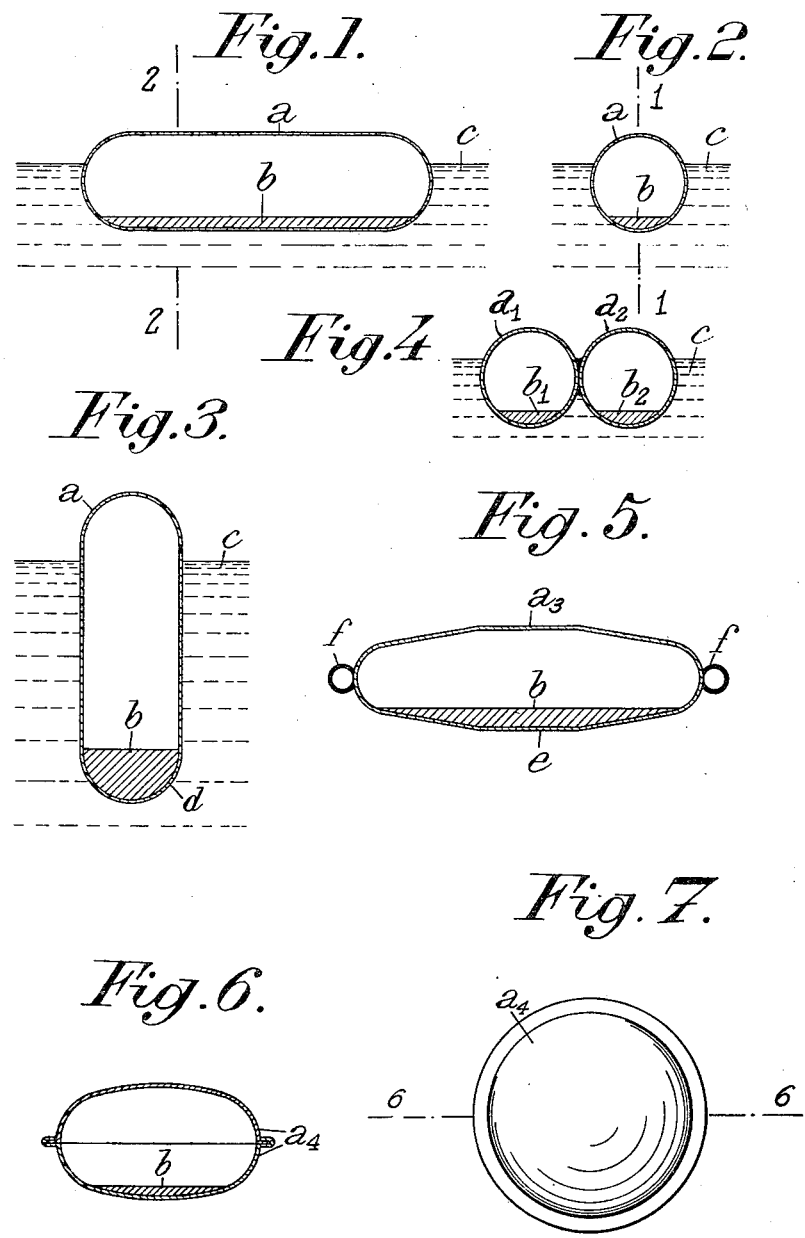

3,054,378
TEMPERATURE INDICATING DEVICES
Louis Abeylard Jean Bienfait, 18 Rue des Robinettes, Eaubonne, France
Filed Oct. 23, 1959, Ser. No. 848,342
Claims priority, application France Nov. 26, 1958
6 Claims. (Cl. 116—114.5)

The present invention has for its object a temperature-indicating device comprising a fluid-tight reservoir designed to float in a liquid, and containing a substance or alloy which is solid when cold and which melts at a certain desired temperature, the passing of said substance or alloy into the liquid state causing a change in the conditions of equilibrium of the floating reservoir, when the liquid in which it floats reaches the desired temperature.

The float is so designed that the change in equilibrium gives a definite visible indication that the liquid in which it floats has reached the temperature required.

The volume and the weight of the reservoir and of the fusible substance which it contains are so calculated that the whole unit floats in the bath of liquid, the greater part being however submerged. When placed in the bath of liquid before or during the heating period of this latter, the float remains substantially in the horizontal position. When the bath reaches the desired temperature, the internal fusible substance melts, and as a result of the slight movements of the reservoir in the bath during the heating period (e.g. by convection, boiling), the said fusible substance flows towards one of its extremities, which causes the float to swing into a vertical position, thus indicating that the bath has reached the required temperature.

After use, the float reservoir is removed from the hot bath and is placed in a horizontal position, on a table for example; when it cools, the fusible substance solidifies along the lower part of the reservoir, which is then again ready for use.

The invention also comprises the application of the temperature indicators of the kind referred to, for use with industrial baths of various types.

In the cooking of foods, and in particular of chipped potatoes, the temperature of the frying bath (oil or other fatty substance) is of very great importance.

By way of indication, depending on the nature of the fatty substances employed, the desired temperature varies from about 120° to 220° C. In the case of peanut oil, which is frequently used, a temperature of 180° C. is satisfactory.

For this purpose, there does not exist at the present time any domestic appliance which performs the function of a simplified form of thermometer.

The invention thus comprises a small domestic appliance which is simple, robust and practical, and which indicates during the heating period when the frying bath has reached the required temperature for the reception of the food to be fried.

In accordance with one form of embodiment of the invention, the float reservoir is made in a flattened shape, formed by the assembly of two half-shells.

In a preferred form of embodiment of the invention, the fusible product contained in the reservoir is constituted by an alloy having a base of tin and bismuth; special provision is made to ensure that the fusible substance or product will adhere satisfactorily while cold to the inner walls of the reservoir.

The invention will be described in more detail in the description which follows below of some forms of embodiment of the invention given solely by way of example and without any implied limitation. This description is given with reference to the accompanying drawings, in which:

FIG. 1 is a longitudinal sectional, on the line 1—1 of FIG. 2, of one form of float reservoir according to the invention;

FIG. 2 is a transverse section on the line 2—2 of FIG. 1;

FIG. 3 shows the same reservoir, as shown in FIG. 1, in the position at which it indicates that the bath of liquid has reached the desired temperature;

FIG. 4 shows, in section similarly to FIG. 2, a form of embodiment comprising two reservoirs having different operating limits, assembled together side by side;

FIG. 5 shows, in section by a middle plane of symmetry, a further form of reservoir having a widened or domed central portion;

FIG. 6 shows, in section on the line 6—6 of FIG. 7, a reservoir formed by the fluid-tight assembly of two half-shells.

FIG. 7 is a plan view of the reservoir of FIG. 6.

Referring now to FIGS. 1 and 2, the reservoir $a$ is a tubular hermetically-sealed vessel with spherical ends which floats in the liquid $c$, the desired temperature of which is to be indicated. The fusible product $b$ is uniformly spread over the length of the reservoir $a$ as shown.

As soon as the liquid $c$ reaches the required temperature, the product $b$ melts and runs toward one extremity of the reservoir $a$, taking up the position in the liquid $c$, as shown in FIG. 3.

It will be understood that the dimensions of the reservoir and the material of which it is composed may vary according to the application concerned, without affecting the nature or the principle of the invention.

In the particular case, the reservoir will preferably be made of metal, and the fusible mass may be one of the alloys of the white metals: tin, lead, antimony, bismuth, the range of which comprises the different desired melting points of the fusible mass.

In addition, different temperature indicators may be employed for the different liquids which may constitute the liquid $c$, operating for example at 150° C. for margarine, 180° C. for peanut oil, etc., in which event only the composition of the fusible mass will vary.

In an alternative form of the invention, the fusible mass may melt, not when the bath has reached the minimum desired temperature (for example 180° C. for peanut oil), but at the maximum temperature (for example 220° C.). By its swing into a vertical position, the float reservoir will then indicate that the frying bath is at its maximum temperature.

According to a further feature of the invention, it is possible to provide a temperature indicator which indicates successively both the minimum and maximum temperature of the frying bath. A device of this type is illustrated in FIG. 4 and comprises a pair of twin tubes $a_1$ and $a_2$, each containing fusible substances $b_1$ and $b_2$ which melt at different temperatures. With this arrangement, the twin float device will be horizontal in the bath during the course of heating and will tilt to 45° from the horizontal when the minimum temperature is reached, completing its swing to the fully-vertical position, when the frying bath has reached its maximum temperature.

In accordance with another embodiment of the present invention, the float reservoir is given a generally flattened shape which ensures a better stability in the horizontal position taken up by the device outside the bath.

It is understood, however, that this form may be slightly domed or cambered in order to facilitate the centering of the fusible mass as it solidifies.

FIG. 5 shows by way of example a reservoir $a_3$ which has a cambered form towards the center $e$, on each side of which extends a substantially flat portion on which the float can rest on a more or less horizontal surface when not in use. The float reservoir may be provided at one or both its extremities with a hooking attachment $f$ by means of which it can be withdrawn with a fork for example, when it is floating vertically in the hot bath.

FIGS. 6 and 7 show another form of reservoir float which is obtained by assembling together two half-shells $a_4$ with a fluid-tight joint, this assembly being carried out for example by welding or by an insetting operation. The fusible substance is shown at $b$.

This particular form enables the length of the float reservoir to be considerably reduced as compared with that of the embodiments previously described for the same volume. Such a float reservoir will work more satisfactorily in a smaller depth of the heated bath of which the temperature is to be indicated. In addition, a substantially flat bottom lends itself to the printing or stamping of inscriptions, especially for advertising purposes.

As regards the fusible material, this can be prepared in various ways. As previously stated, there is an advantage to be obtained by the use of a fusible alloy with a base of tin and bismuth, but it will be clear that cadmium may also be used.

A particularly useful alloy is that which contains 60% of tin and 40% of bismuth.

It has also been previously mentioned that it is an advantage to ensure a good adhesion of the fusible mass $b$ to the walls of the float reservoir. To this end, any means for increasing this adhesion may be employed. Thus, it is for example advantageous to tin the inner surface of the float. A tinned surface does in fact ensure a good adhesion with respect to an alloy of the kind referred to above.

In a general manner, while I have, in the above description, disclosed what I deem to be practical and efficient embodiments of my invention, I do not wish to be limited thereto as there might be changes made therein, as comprehended within the scope of the appended claims.

What I claim is:

1. A temperature indicating device designed to float in a liquid to be heated, comprising a fluid tight reservoir means having a diameter in a first direction, which diameter is longer than the diameter in a second direction perpendicular to said first direction, and a mass of a fusible substance solid at ordinary temperature, molded inside of and partly filling said reservoir means and extending in a layer in said first direction so that said reservoir means is adapted to float in the liquid with the diameter in the first direction extending horizontally, said substance being chosen to melt at a predetermined temperature to be reached by said liquid, whereby upon melting said substance is dislocated inside said reservoir means as a result of a change in the conditions of equilibrium so as to make said reservoir means float with the diameter in the second direction extending horizontally, thereby giving a definite visible indication of the predetermined temperature to be reached by said liquid.

2. A temperature indicating device designed to float in a liquid to be heated, comprising a fluid tight reservoir means having a diameter in a first direction, which diameter is longer than the diameter in a second direction perpendicular to said first direction, said reservoir means having a first and a second elongate vessel being fixed together along wall portions in said first direction, and a mass of a fusible substance, solid at ordinary temperature, molded inside of and partly filling each of said vessels and extending in layers in said first direction so that said vessels are adapted to float in the liquid with the diameter in the first direction extending horizontally, said substance in the first vessel being chosen to melt at a predetermined temperature to be reached by said liquid and said substance in the second vessel having a melting point different from that of the substance in the first vessel whereby upon melting of the substance in said first vessel said substance is dislocated inside said first vessel as a result of a change in the conditions of equilibrium, so as to make said reservoir means float at a position tilted substantially 45° relative to the position in which the diameter in the first direction extends horizontally, and at a position tilted 90° relative thereto upon the subsequent melting of the substance in the second vessel.

3. An indicator device as claimed in claim 1, in which said reservoir means is formed by two half-shells fixed together around their periphery by a fluid-tight joint.

4. An indicator device as claimed in claim 1, in which said fusible substance is an alloy of at least two metals chosen from the group consisting of: tin, bismuth, cadmium, lead, antimony.

5. An indicator device as claimed in claim 1, in which said fusible substance is an alloy containing about 60% of tin and about 40% of bismuth.

6. An indicator device as claimed in claim 1, in which the inner wall of said reservoir means is tinned in order to increase the adhesion of said fusible substance in the cold state to said inner wall.

References Cited in the file of this patent

UNITED STATES PATENTS

| | | |
|---|---|---|
| 2,046,863 | Allphin | July 7, 1936 |
| 2,195,395 | Chapman | Apr. 2, 1940 |